United States Patent
Bondioli (10) Patent No.: US 11,359,592 B2
(45) Date of Patent: Jun. 14, 2022

(54) AUTOMATIC STARTING FLYWHEEL

(71) Applicants: Lea Lusetti, Suzzara (IT); Carlo Bondioli, Suzzara (IT); Claudio Bondioli, Borgo Virgilio (IT)

(72) Inventor: Edi Bondioli, Suzzara (IT)

( * ) Notice: Subject to any disclaimer, the term of this patent is extended or adjusted under 35 U.S.C. 154(b) by 0 days.

(21) Appl. No.: 17/065,331

(22) Filed: Oct. 7, 2020

(65) Prior Publication Data

US 2021/0108604 A1 Apr. 15, 2021

(30) Foreign Application Priority Data

Oct. 10, 2019 (IT) .......................... 102019000018479

(51) Int. Cl.
*F02N 5/04* (2006.01)
*F02N 15/00* (2006.01)

(52) U.S. Cl.
CPC ............. *F02N 5/04* (2013.01); *F02N 15/006* (2013.01)

(58) Field of Classification Search
CPC ...... F02N 5/04; F02N 15/006; A01F 15/0841; F16F 15/30
See application file for complete search history.

(56) References Cited

U.S. PATENT DOCUMENTS

| | | | | |
|---|---|---|---|---|
| 1,683,954 A | * | 9/1928 | Carrey | F16D 43/18 192/105 BA |
| 5,697,845 A | * | 12/1997 | Curtis | F16F 1/027 192/201 |
| 5,816,924 A | * | 10/1998 | Kajitani | F16F 15/1202 464/68.2 |
| 2012/0111689 A1 | * | 5/2012 | Atkins | H02K 49/102 192/84.3 |
| 2012/0190461 A1 | * | 7/2012 | Atkins | H02K 49/102 464/29 |

FOREIGN PATENT DOCUMENTS

| | | |
|---|---|---|
| DE | 10 2008 017352 A1 | 3/2009 |
| EP | 3 508 052 A1 | 7/2019 |
| FR | 2203583 A1 | 5/1974 |

* cited by examiner

*Primary Examiner* — Sizo B Vilakazi
(74) *Attorney, Agent, or Firm* — McGlew and Tuttle, P.C.

(57) ABSTRACT

The flywheel (3) comprises a flywheel mass (5) and an automatic starting device (9) for driving into rotation the flywheel mass (5), coaxial with the flywheel mass (5), rotatable with respect to the flywheel mass, and adapted to be torsionally coupled to a motion input (7). The automatic starting device (9) comprises a drag torque transmission member for transmitting drag torque from the automatic starting device (9) to the flywheel mass (5), adapted to transmit a torque that increases as the angular speed of the automatic starting device increases.

20 Claims, 6 Drawing Sheets

AUTOMATIC STARTING FLYWHEEL

TECHNICAL FIELD

The present invention relates to an automatic system for facilitating start of flywheels. Embodiments described herein especially relate to improvements to flywheels to be used on mechanical transmissions. The invention also relates to systems using these flywheels.

BACKGROUND TO THE INVENTION

Flywheels are members for regularizing the operation of mechanical systems comprising a power source and a driven organ. The greater the inertia of the flywheel, the lower the speed variations generated by the periodic load and the more regular the operation of the driven machine and the driving machine (power source). However, by increasing the flywheel inertia, the starting and stopping phases of the driven machine become more difficult and longer.

The start is particularly critical when the power source is an internal combustion engine, which tends to turn off or supplies very low starting torque if the rotational speed is low. In many applications it is necessary to use an internal combustion engine over-sized with respect to the steady-state load, with the sole aim of having a sufficient starting torque.

Typically, this kind of problems occurs, for example, in large square balers. These machines are characterized by a compression machine for pressing the material to be packaged, in which the material is pressed by means of a piston actuated by a rod-crank mechanism. The piston presses the material for about 20% of the travel generating a periodic load characterized by very high thrust peaks followed by virtually zero thrust strokes. Due to the type of operation, the square balers require large flywheels.

Thanks to the continuous search for continuously increasing performance, aimed at increasing the number of bales produced per hour and the density thereof, nowadays these machines are equipped with flywheels of ever larger size with the aim of increasing the inertia thereof and have more energy available to overcome the thrust peak and to reduce loads on mechanical transmissions during work. But this made the start-up phases more difficult even for more powerful tractors, for the reasons mentioned above.

In order to overcome these drawbacks, a dual-mass flywheel has been provided (EP3508052). During the starting phase one of the two masses remains idle with respect to the transmission shaft, whilst the other mass is driven into rotation by the engine. When a given rotational speed has been achieved, also the second mass is coupled to the transmission shaft through a hydraulic control. This newly conceived flywheel is particularly efficient and allows overcoming the drawbacks of the prior art flywheels, especially when applied to agricultural machines such as large square balers.

However, the dual-mass flywheel has a complex structure. Therefore, it would be useful to provide a flywheel adapted to improve power transmission from a power source to a variable load, in order to overcome the prior art drawbacks described above thanks to a simpler system.

A further dual-mass flywheel is disclosed in U.S. Pat. No. 1,683,954. In this known flywheel, two flywheel discs are provided, adjacent to each other and coaxial with the rotation axis of the flywheel, each of which forms a flywheel mass. A first flywheel mass is integral with a drive shaft and the second flywheel mass is supported idle on the drive shaft and is keyed on a motion output shaft. When the flywheel is started-up, the drive shaft drives the first flywheel mass into rotation, whilst the second flywheel mass and the motion output shaft are still. As the number of revolutions increases, a series of inertial masses, rotating integrally with the first flywheel mass, are radially pushed outwards and cause the first flywheel mass and the second flywheel mass to couple together angularly, so that also the second flywheel mass is driven into rotation, transmitting motion to the motion output shaft. Therefore, the motion output shaft in this known device is still until both discs forming the overall flywheel mass are driven into rotation, if necessary with the second disc rotating at a temporarily lower rotational speed than that of the first disc.

In other flywheels used, for example, in the automotive industry, the use of two flywheel discs coupled to each other through an elastic system is known, so that the two discs, even if rotating in essentially synchronous fashion, are adapted to move angularly with respect to each other by a limited angle. A damping elastic system torsionally connects the two discs. In some cases, when the number of revolutions is low, the two inertial masses, represented by the two flywheel discs, are torsionally coupled rigidly. Systems of this kind are disclosed in U.S. Pat. No. 5,816,924 and in DE102008017352.

SUMMARY

According to a first aspect, a flywheel is provided, comprising a flywheel mass and an automatic starting device for driving into rotation the flywheel mass, coaxial with the flywheel mass, rotatable with respect to the flywheel mass, and adapted to be torsionally coupled to a motion input.

The automatic starting device comprises a drag torque transmission member for transmitting a drag torque from the automatic starting device to the flywheel mass, adapted to transmit a torque that increases with the angular speed of the automatic starting device.

Practically, the automatic starting device is as adapted to generate a drag torque by friction on the flywheel mass. The friction torque is a function of the centrifugal force that, due to the rotation of a drive shaft, acts on radially movable masses. These masses are radially pushed outwards to press against a surface integral with the flywheel mass. As a result of the generated friction force, an acceleration torque is transmitted to the flywheel mass.

As the torque making the flywheel mass angularly accelerate is transmitted not through a positive mechanical coupling but by friction, the resistant torque on the drive shaft generated by the inertia of the flywheel mass is limited. In other words, the torque transmitted to the flywheel mass is limited to the maximum torque that can be generate by the power source. If the starting torque of the power source, for instance an internal combustion engine, is not enough to drive from the beginning the flywheel mass into rotation at the rotational speed of the drive shaft of the power source, the flywheel mass slides with respect to the drive shaft. Therefore, during a transient angular acceleration step the flywheel mass is subjected to an acceleration torque, transmitted by friction, making the flywheel mass accelerate gradually until it reaches the angular speed of the drive shaft, without overloading the transmission line and without the risk that the power source is shut-off.

In some embodiments, the flywheel mass is integral with a housing for bearings arranged between the flywheel mass and the a transmission shaft. The bearings support the flywheel mass idle on the transmission shaft. The transmission shaft can therefore start rotating without drawing the flywheel mass into rotation. The flywheel mass begins angularly to accelerate gradually due to the friction force transmitted by the automatic starting device.

In embodiments disclosed herein, the automatic starting device comprises a hub coaxial with the flywheel mass, and a plurality of movable masses that are arranged around the rotation axis of the flywheel, torsionally coupled to the hub and adapted to be radially displaced with respect thereto. The radial movement of the movable masses may be very small and just sufficient to modulate the friction force between the movable masses and the flywheel mass due to the centrifugal force exerted on the movable masses as a result of the hub drawing them into rotation and thanks to the radial movement capability. In practice, each movable mass may be kept in a given radial position as it rests against a surface of contact with the flywheel mass, arranged radially outside of the movable masses. The space available for radial movement between movable masses and flywheel mass may be negligible from a kinetic viewpoint, and is substantially given by the clearance between movable mass and flywheel mass, this clearance being reduced to zero due to the centrifugal force pushing the movable mass that is pressed and rests against the flywheel mass when the hub (and the movable masses torsionally coupled thereto) begin to rotate.

The hub, to which the movable masses are coupled, can be torsionally coupled to a transmission shaft.

Advantageously, in order to reduce the flywheel costs and to simplify the structure thereof, the movable masses can be only two. The movable masses may be shaped like an arc of a circular ring and form together an annularly extending assembly coaxial with the axis of the hub and of the flywheel mass.

Advantageously, the movable masses have a perimeter surface adapted to couple by friction to the flywheel mass, which has a surface of contact with the movable masses. The contact may be provided by means of perimeter friction shoes arranged along the outer annular edge of each movable mass and co-acting with the contact surface of the flywheel mass.

In order to provide effective and simple coupling between the movable masses and the hub, each movable mass may be anchored to the hub by means of a pin housed in a radial seat and movable with respect thereto. The pin is fastened to the hub so that the pin axis is fixed with respect to the hub, and the radial seat is rigidly fastened to the movable mass, or vice versa. With this arrangement, the movable mass can move, even slightly, radially with respect to the hub, and can be torsionally coupled to the hub, i.e. the movable mass is driven into rotation together with the hub. Advantageously, each pin may be parallel to the flywheel rotation axis.

The invention further concerns a motion transmission system for transmitting motion between a power source and a driven machine, comprising a motion transmission line on which a flywheel as defined above is arranged. The power source may be an internal combustion engine, and the driven machine may be a agricultural machine. In particular, the driven machine may be a machine where the resistant torque cyclically changes in a significant manner, that therefore requires a large flywheel for smooth operation. The agricultural machine may be a large square baler, for example.

The invention further concerns a method for driving into rotation a driven machine through a power source by means of a motion transmission line on which a flywheel is provided. The method comprises the step of driving into rotation the motion transmission line and an automatic flywheel starting device. The automatic starting device comprises a drag torque transmission member for transmitting a drag torque from the automatic starting device to a flywheel mass of the flywheel. The automatic starting device rotates integrally with the motion transmission line. The method further comprises the step of transmitting, through friction generated by centrifugal force, a torque from the automatic starting device to the flywheel mass, causing a gradual acceleration of the flywheel mass up to achieving a rotational speed of the motion transmission line. Once the flywheel mass has achieved the rotational speed of the motion transmission line, the flywheel mass and the motion transmission line rotate synchronously, i.e. at the same angular speed.

Further features and embodiments are described below and defined in the attached claims.

BRIEF DESCRIPTION OF THE DRAWING

The invention will be better understood by following the description below and the attached drawing, showing a non-limiting embodiment of the invention. More specifically, in the drawing.

DETAILED DESCRIPTION

The detailed description below of exemplary embodiments is made with reference to the attached drawing. The same reference numbers in different figures identify equal or similar elements. Moreover, the drawings are not necessarily to scale. The detailed description below does not limit the invention. Rather, the scope of protection of the present invention is defined by the attached claims.

In the description, the reference to "an embodiment", "the embodiment" or "some embodiments" means that a particular feature, structure or element described with reference to an embodiment is comprised in at least one embodiment of the described subject matter. The sentences "in an embodiment" or "in the embodiment" or "in some embodiments" in the description do not therefore necessarily refer to the same embodiment or embodiments. The particular features, structures or elements can be furthermore combined in any suitable way in one or more embodiments.

Briefly, the flywheel comprises a flywheel mass and a gradual automatic starting device coupling the flywheel mass to the transmission shaft. At the beginning, the flywheel mass is idle with respect to the transmission shaft when this latter is still. Thanks to the automatic starting device, as the rotational speed of the transmission shaft increase, the torque transmitted from the transmission shaft to the flywheel mass increases until it achieves a steady-state condition, where the flywheel mass rotates integrally with the transmission shaft. The transmitted torque increases as the centrifugal forces generated by the rotation of the transmission shaft increases.

With this novel flywheel, a power source with a limited starting torque is sufficient, because, when the flywheel is started-up, the flywheel mass does not need to be driven into rotation integrally with the transmission shaft.

Figure 1:
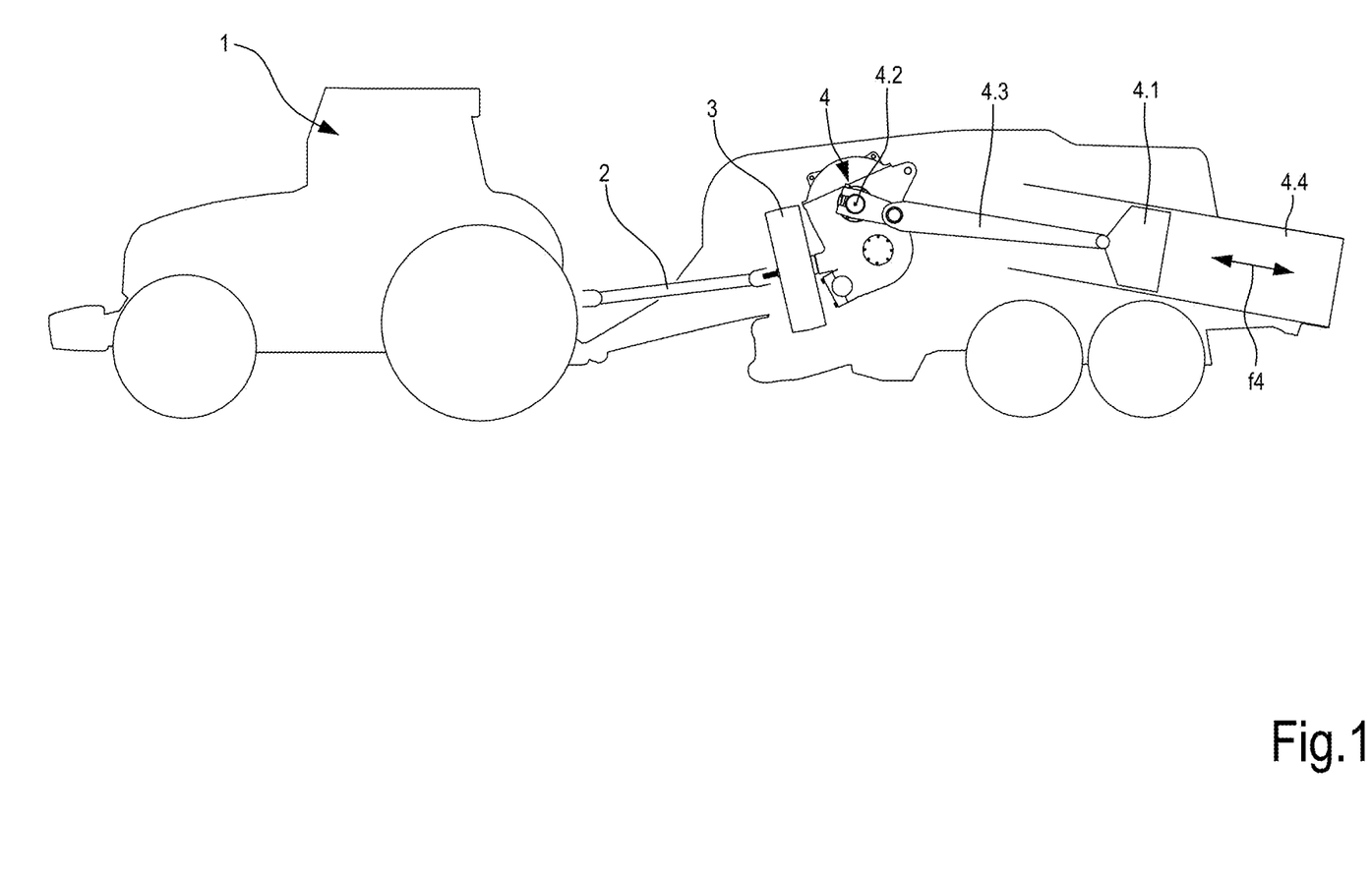
FIG. 1 shows a diagram of a power source and a driven machine where a flywheel of the invention can be used.

FIG. 1 shows an assembly comprising a power source 1, that in the farm industry may be a tractor, or more exactly internal combustion engine of the tractor. The power source 1 is coupled to the input shaft of a load 4 by means of a Cardan shaft. A flywheel 3 according to the present invention is provided on the transmission. The flywheel 3 is an automatically started flywheel, as detailed below.

Just by way of example, in the particularly advantageous non-limiting embodiment of FIG. 1 the load 5 is, a large square baler. As mentioned above, in these machines the resistant torque cyclically fluctuates significantly during operation. The power supplied by the power source 1 is used, in this case, to drive a piston 4.1 by means of a crank shaft 4.2 and a rod 4.3. The piston 4.1 moves with reciprocating motion (double arrow f5) in a chamber 4.4. The crank shaft 4.2 is housed in a casing or box 4.6, in which a transmission shaft, described below and to which a composite flywheel 13 is associated, extends.

The structure of the flywheel 3 is described in detail hereinafter with reference to FIGS. 2 to 10.

Figure 2:
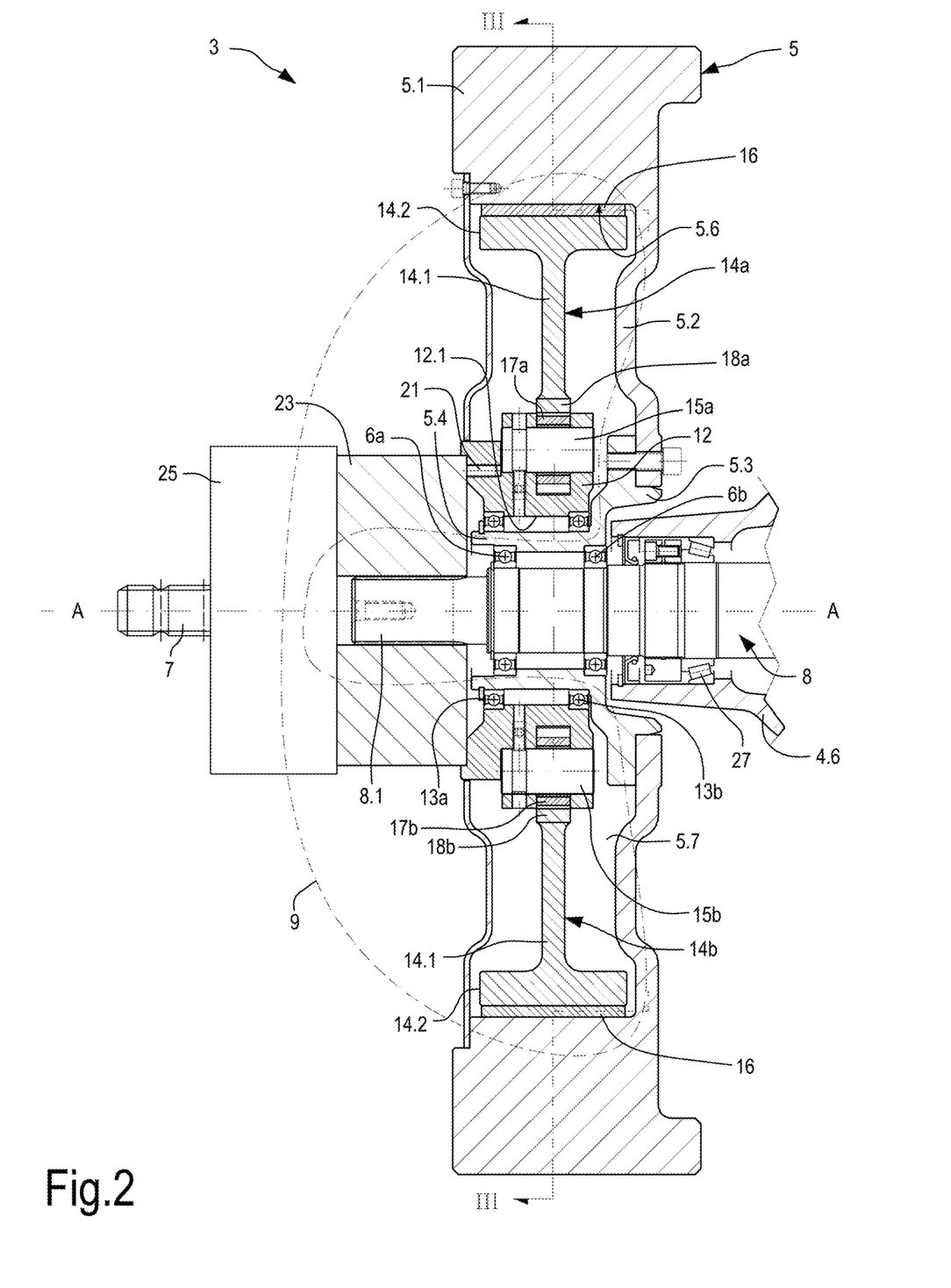
FIG. 2 shows a cross-section of the flywheel installed on the respective transmission shaft, according to a plane containing the rotation axis.

With specific reference to FIG. 2, the flywheel 3 comprises a flywheel mass 5, the rotation axis whereof is labeled A-A. In the illustrated embodiment, the flywheel mass comprises a main annular body 5.1, representing the outermost radial portion of the flywheel mass 5 and constituting most of the mass. The main annular body 5.1 is connected, through a wall 5.2, to a sleeve 5.4 provided with a flange 5.3 for the connection to the wall 5.2. In the inside of the sleeve 5.4 a seat is provided for support bearings 6a, 6b, for instance ball bearings, supporting the flywheel mass 5 on a transmission shaft 8. In the described configuration, the transmission shaft 8 represents the output shaft for the flywheel 3, and at the same time the drive shaft for the driven machine or load 4. The reference number 7 indicates the input shaft for the flywheel 3, actuated by the power source 1 through the Cardan transmission 2. In practice, the input shaft 7 and the output shaft 8 are torsionally coupled together and form a transmission shaft that, together with the Cardan transmission 2, defines the transmission line for transmitting power from the power source 1 to the driven machine 4.

In addition to the flywheel mass 5, the flywheel 3 also comprises an automatic starting device for driving into rotation the flywheel mass 5. The automatic starting device is indicated as a whole with the reference number 9, and is so configured as to couple gradually the flywheel mass 5 torsionally to the shafts 7 and 8 during the angular acceleration step when the driven machine 4 is started-up. Similarly, the automatic starting device allows, during the slow-down step, to release torsionally the flywheel mass 5 from the input shaft and the output shaft to facilitate the step of slowing-down and stopping the driven machine 4.

In the illustrated embodiment, the automatic starting device 9 is coaxial and concentric with the main annular body 5.1 of the flywheel mass 5 and with a contact friction surface 5.6 formed by the main annular body 5.1 of the flywheel mass 5 and radially facing the rotation axis A-A. In practice, as shown in FIG. 2, the automatic starting device 9 is housed in a cavity 5.7, particularly of annular shape, formed in the flywheel mass 5 between the main annular body 5.1, the sleeve 5.4 and the circular wall 5.2. The annular cavity 5.7 is bordered radially outwards by the contact friction surface 5.6 surrounding the automatic starting device 9, and radially inwards by the sleeve 5.4.

In the illustrated embodiments, the automatic starting device 9 comprises a hub 12 coaxial with the flywheel mass 5. The hub 12 is illustrated in isolation in FIGS. 9, 10, and 11. The hub 12 comprises a through central hole 12.1, through which the sleeve 5.4 of the flywheel mass 5 extends. In the central hole 12.1 support bearings 13a, 13b are housed, for example radial ball bearings, interposed between the hub 12 and the sleeve 5.4 of the flywheel mass 5. The bearings 13 allows the mutual rotation of the hub 12 and the sleeve 5.4 (and therefore the flywheel mass 5) around the common axis A-A.

Masses 14a and 14b are coupled to the hub 12 in the manner described below. These masses are torsionally coupled to the hub 12 but radially movable with respect thereto; therefore, they will be indicated below as "movable masses 14a, 14b". Both the hub 12 and the masses 14a, 14b are housed inside the annular cavity 5.7 formed in the flywheel mass 5.

Advantageously, as shown in particular in FIGS. 2 and 3, each movable mass 14a, 14b is fastened to the hub 12, advantageously in central position, so that, due to the centrifugal force, it tends to translate radially outwards with respect to the hub, as better detailed below.

Figure 4:
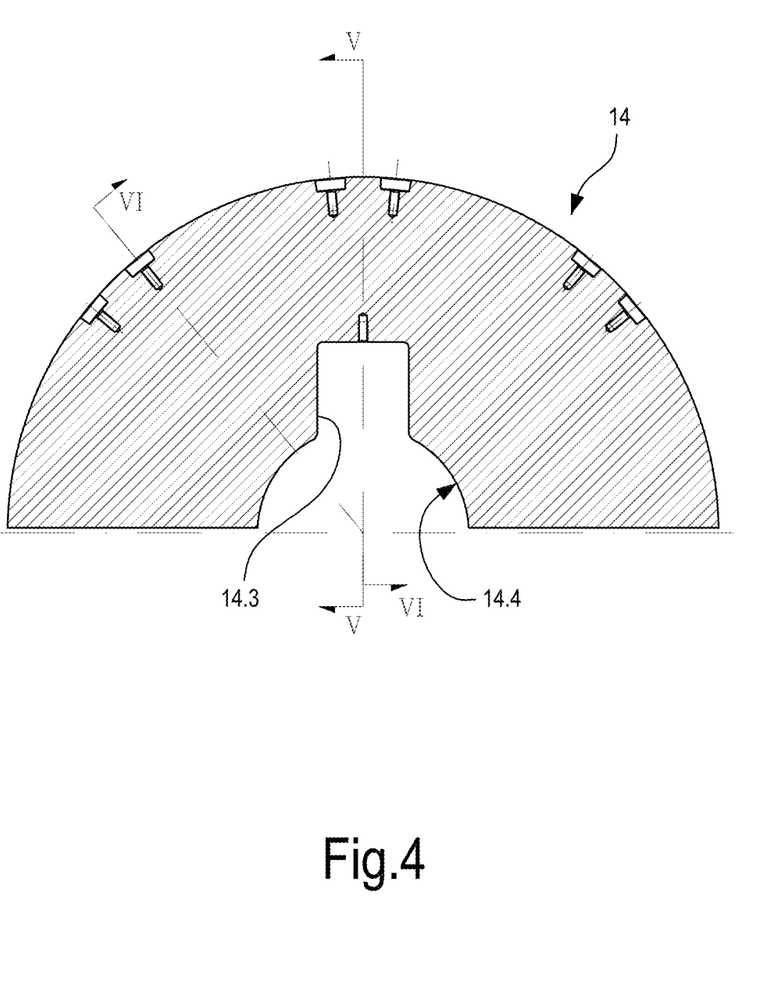
FIG. 4 shows a cross-section according to IV-IV of FIG. 6 of one of the movable masses of the automatic starting device.
Figure 5:
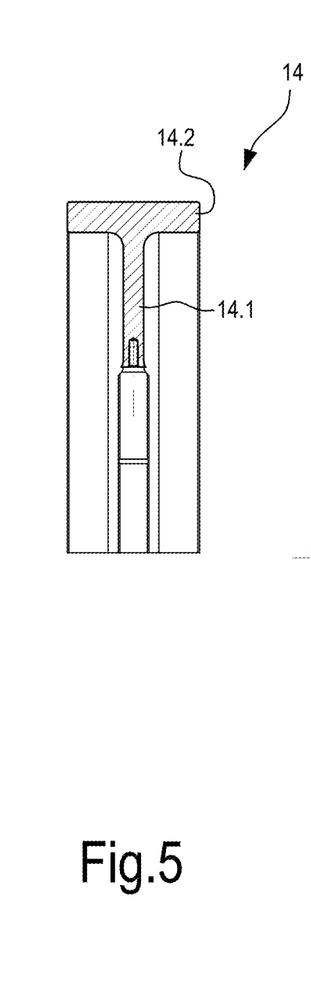
FIG. 5 shows a cross-section according to V-V of FIG. 4.
Figure 6:
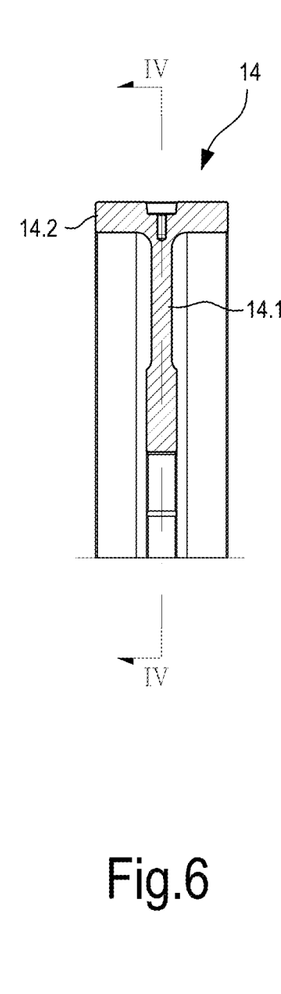
FIG. 6 shows a cross-section according to VI-VI of FIG. 4.
Figure 8:
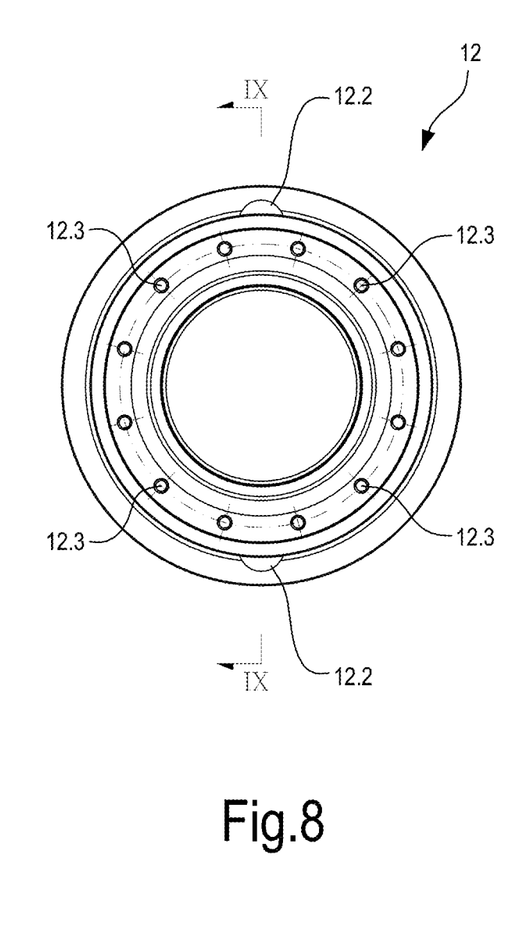
FIG. 8 is a front view of the hub of the automatic starting device.
Figure 9:
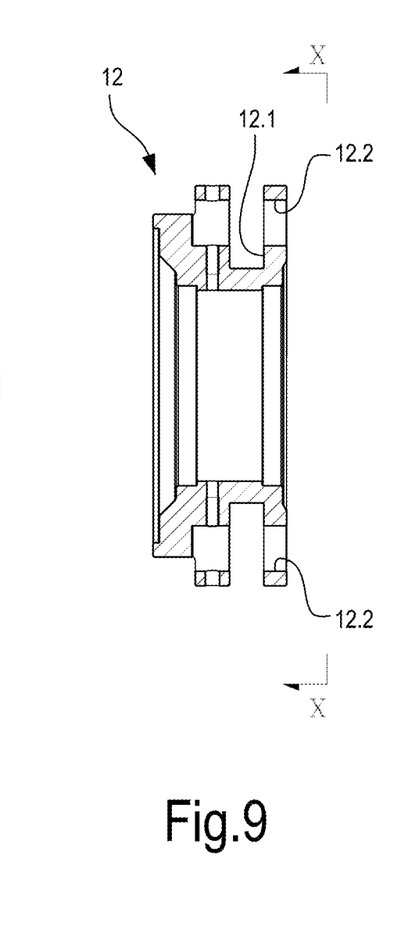
FIG. 9 shows a cross-section of the hub according to IX-IX of FIG. 8.
Figure 10:
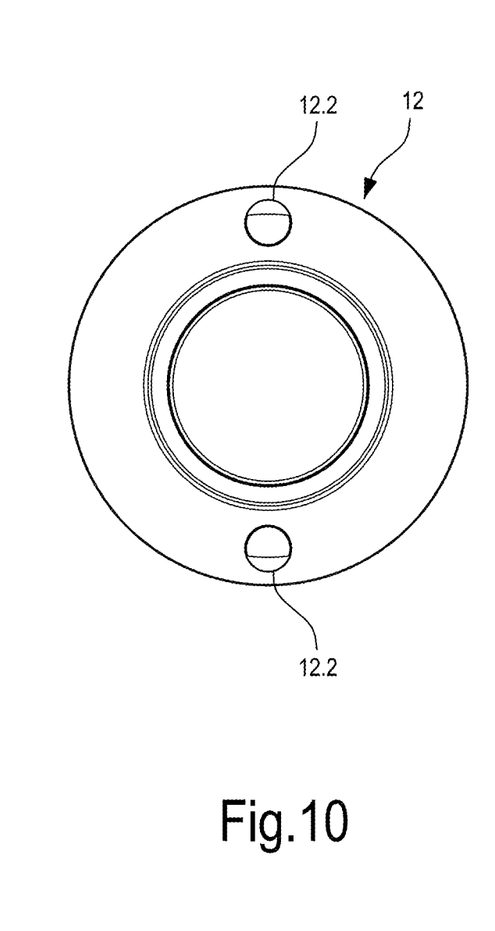
FIG. 10 is a view according to X-X of FIG. 9.

FIGS. 4, 5, and 6 show different cross-sections of one of the movable masses 14, separately from the other components of the flywheel 3. The movable mass illustrated in FIGS. 4, 5, and 6 is simply indicated with the reference number 14, as it can indifferently represent the one or the other of the movable masses 14a, 14b.

As shown in particular in FIG. 2, each movable mass 14a, 14b has a T-shaped radial cross-section. In practice, in the illustrated embodiment, each movable mass 14a, 14b has a semi-annular wall 14.1, wherein the semi-circular inner edge 14.4 thereof is housed in an annular seat 12.1 of the hub 12 (see FIG. 9), and an expanded portion 14.2 extending along the semi-circular outer edge of the semi-annular wall 14.1.

Each movable mass 14a, 14b is fastened to the hub 12 so as to rotate integrally therewith around the axis A-A, being free of moving radially when pushed by the centrifugal force generated by the rotation of the hub 12 and of the movable masses 14a, 14b around the axis A-A.

In some embodiments, each movable mass 14a, 14b is coupled to the hub 12 through a pin, indicated with 15a, 15b respectively. Each pin 15a, 15b is anchored to the hub 12, for example inserted in holes 12.2 of the hub 12 (see FIGS. 9, 10, and 11). A sliding bearing 17a, 17b is mounted around each pin 15a, 15b respectively. Each movable mass 12a, 12b has a radial seat for housing the pin 15a, 15b and the respective sliding bearing 17a, 17b. The radial seat may be directly provided in the semi-annular wall 14.1 of each movable mass 14a, 14b. However, in order to achieve better operation and lower wear, a shoe 18a, 18b is preferably integral with each movable mass 14a, 14b, the shoe being made of hardened metal, for example, and forming the seat for the respective sliding bearing 17a, 17b. In FIG. 7 one of the shoes is shown, indicated with the reference number 18.

As mentioned above, the coupling between the hub 12 and each movable mass 14a, 14b is advantageously provided in an approximately central position with respect to the movable mass. For example, the axis of the pin 15a, 15b is arranged approximately on the radial plane passing through the centerline of the movable mass 14a, 14b.

Figures 3, 7:
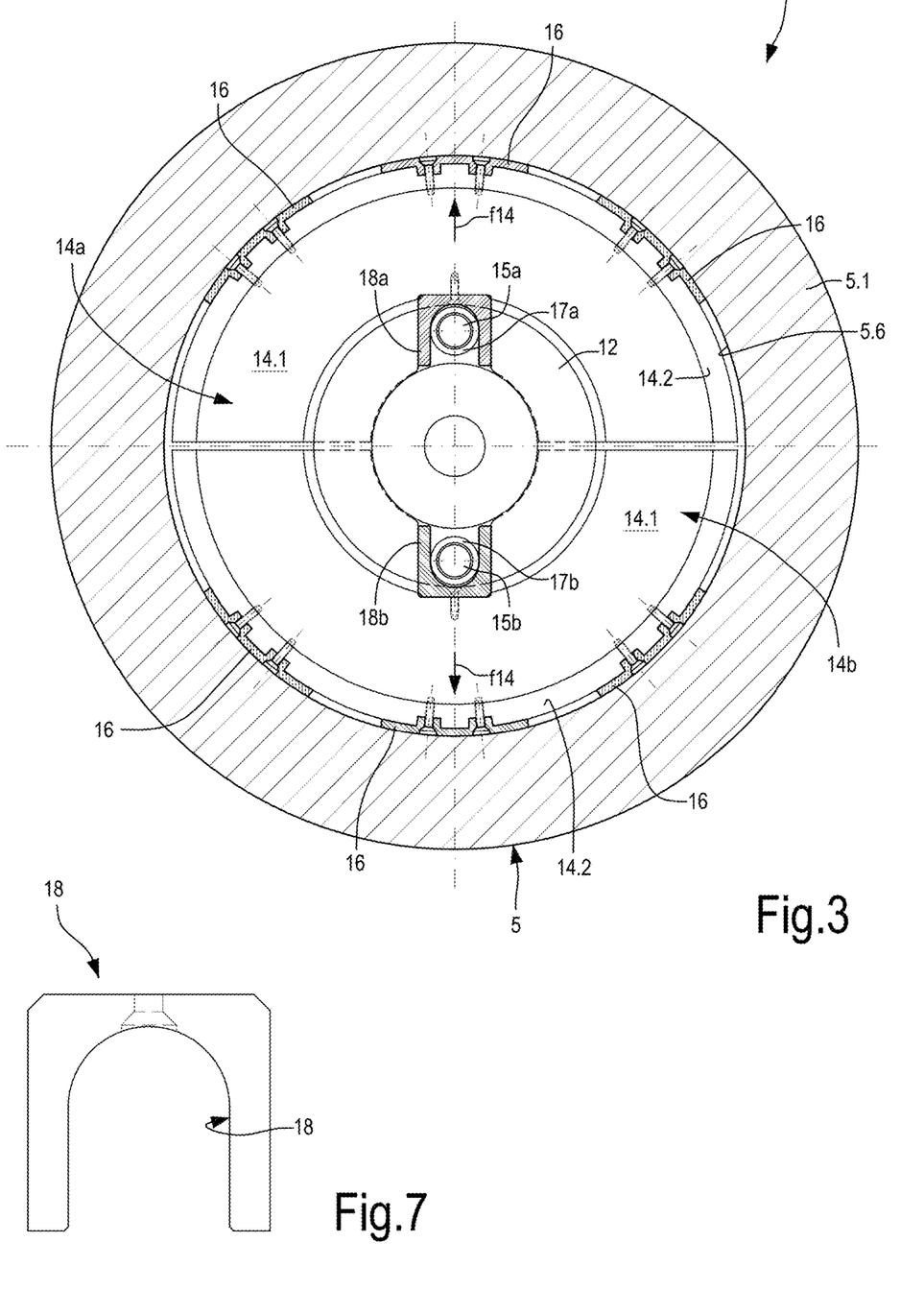
FIG. 3 shows a cross-section according to the line III-III of FIG. 2.
FIG. 7 is a view of a shoe forming the seat for housing the pins connecting the movable masses to the hub.

As shown in particular in FIG. 7, the shoe 18 has an inner surface 18.1 where the sliding bearing 17a, 17b rolls. The inner surface 18.1 extends radially so that the pin 15a, 15b with the respective sliding bearing 17a, 17b can move in radial direction in the seat formed by the surface 18.1. In practice, this allows each movable mass 14a, 14b to move slightly radially with respect to the hub 12 and therefore to the rotation axis A-A of the flywheel 3. In FIGS. 2 and 3, the arrow f14 indicates the direction of movement of the masses 14a, 14b with respect to the hub 12.

As shown in particular in FIG. 4, each movable mass 14a, 14b has a recess 14.3 where the respective shoe 18a, 18b is housed. The recess is open along the radially inner edge 14.4 (FIG. 4) of the respective movable mass 14a, 14b.

In the illustrated embodiment, along the outermost radial edge, each movable mass 14a, 14b is provided with perimeter friction shoes 16, forming friction surfaces adapted to co-act with the contact surface 5.6 provided on the flywheel mass 5. Advantageously, one of the friction shoes 16 is provided in the central area of the outer semi-circular edge of the semi-annular wall 14.1. In the illustrated example, two further friction shoes are provided, arranged symmetrically on the left and the right of the central friction shoe. In the illustrated embodiment, the contact surface 5.6 is a substantially cylindrical surface, as shown in particular in FIG. 3. The cylindrical surface 5.6 peripherally delimits a space for containing the movable masses 14a, 14b. As better detailed below, when the hub 12 is driven into rotation, the movable masses 14a, 14b rotate with the hub 12 due to the coupling formed by the pins 15a, 15b. Due to the centrifugal force acting on the movable masses 14a, 14b, these latter are pushed radially outwards and pressed with the friction shoes 16 against the contact surface 5.6, thanks to the fact that each movable mass 14a, 14b is sufficiently free to move radially.

In the embodiment illustrated in FIG. 2, the drive shaft, or input shaft 7, is torsionally coupled to the hub 12 stably. The coupling may be provided by means of a plurality of screws 21 screwed in threaded holes 12.3 of the hub 12 (see FIG. 8). One or more transmission members may be provided between the input shaft 7 and the hub 12. In the embodiment illustrated just by way of example, a torque limiter 23 and a free-wheel clutch 25 are provided.

The input shaft 7 is torsionally coupled to an end 8.1 of the output shaft 8, for example through a splined profile. The output shaft 8 is supported, through bearings 27, in the box 4.6 of the driven machine 4 and projects therefrom so as to couple to the flywheel 3.

As it is clearly apparent from FIG. 2, when the input shaft 7 is driven into rotation by the power source 1, the rotation is transmitted, through the free-wheel clutch 25 and the torque limiter 23, to the output shaft 8 and, therefore, to the driven machine 4. The hub 12 and the movable masses 14a, 14b rotate integrally with the shafts 7 and 8.

At low rotational speed, due to the low centrifugal force acting on the movable masses 14a, 14b, the force with which the friction shoes 16 are pressed against the contact surface 5.6 of the flywheel mass 5 is not enough to drive this latter into rotation. Therefore, the flywheel mass 5 remains substantially still, whilst the hub 12, the input shaft 7, the output shaft 8 and the movable masses 14a, 14b rotate at the same rotational speed. The sleeve 5.4 interposed between output shaft 8 and hub 12 remains substantially still thanks to the bearings 13a, 13b and 6a, 6b.

As the rotational speed of the input shaft 7 and the output shaft 8 increases, the centrifugal force acting on the movable masses 14a, 14b increases. The movable masses 14a, 14b are pushed radially outwards, with a consequent increase in the friction force between the friction shoes 16 and the contact surface 5.6 of the flywheel mass 5. Consequently, the torque transmitted to the flywheel mass 5 increase, and the flywheel mass is gradually accelerated in rotation. As specified above, this increase in the radial thrust and the consequent increase in the friction force result from the fact that the movable masses 14a, 14b are not locked against the contact surface 5.5 of the flywheel mass, but have a clearance, even if minimum, and can therefore move radially.

As it is well understood from the description above, the flywheel 3 with the automatic starting device 9 allows gradually and automatically accelerating the flywheel mass 5 during the start-up step of the driven machine 4.

Figure 11:
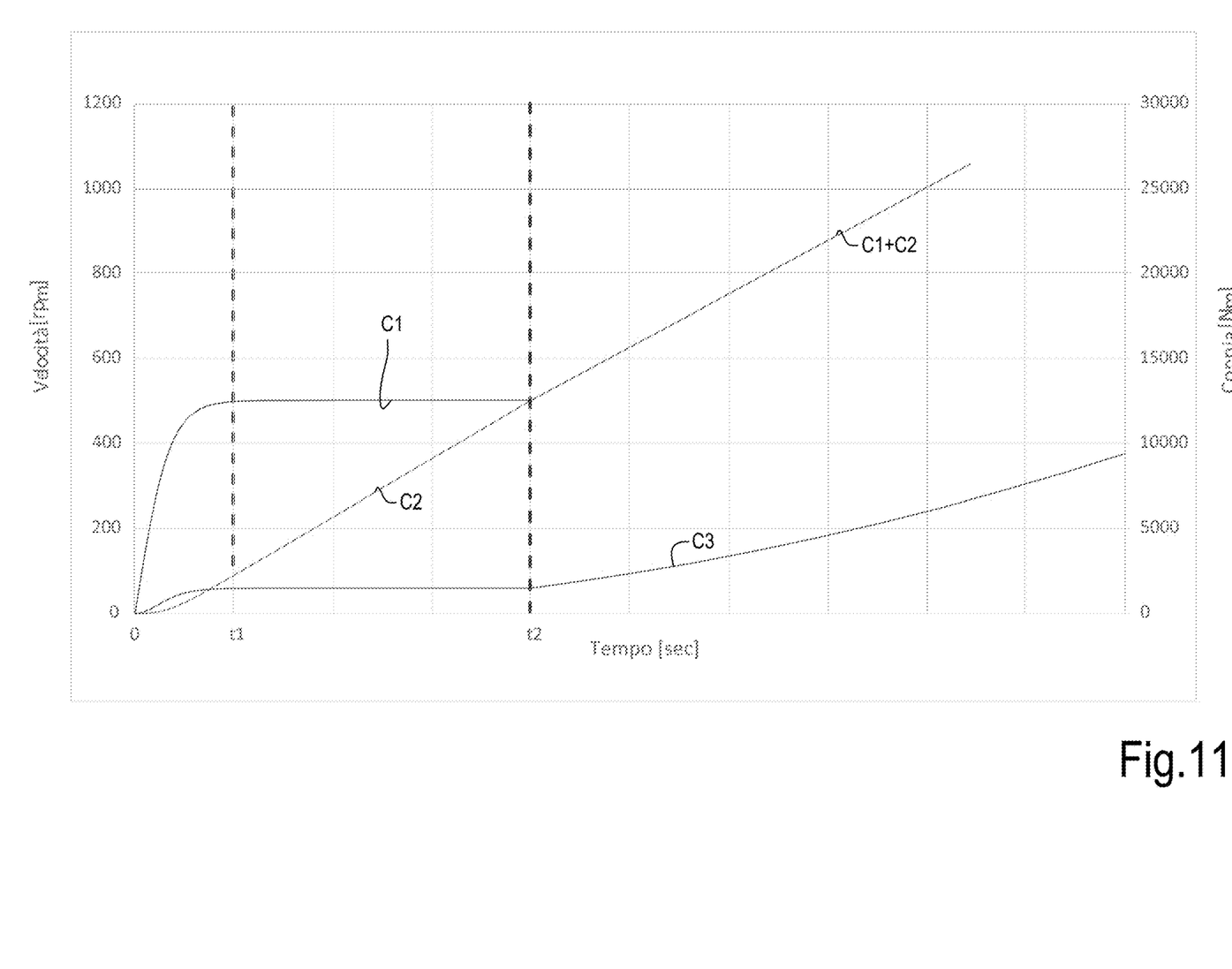
FIG. 11 shows a graph illustrating the step when the flywheel starts to rotate.

For better and more deeply understanding the operation of the automatic starting device 9 and the flywheel 3 incorporating it, reference can be made to the graph of FIG. 11, showing the trend of the rotational speed of the shafts 7, 8 and of the flywheel mass 5, as well as the trend of the torque transmitted from the movable masses 14a, 14b to the flywheel mass 5 as a function of time.

More exactly, FIG. 11 shows a graph with the time on the x-axis and the rotational speed, expressed in rpm, and the torque transmitted from the movable masses 14a, 14b to the flywheel mass 5, expressed in Nm, on the y-axis. The following curves are shown in the graph:

C1: rotational speed (rpm) of the input shaft 7, the output shaft 8, the hub 12 and the movable masses 14a, 14b;
C2: rotational speed (rpm) of the flywheel mass 5;
C3: torque transmitted by friction from the movable masses 14a, 14b to the flywheel mass 5 (Nm).

In the instant t=0 the driven machine 4 is started-up. In the graph of FIG. 11 three steps can be distinguished. At the beginning of the first step, from the instant t0 to the instant t1, the flywheel mass 5 is substantially idle, as the friction torque exerted by the friction shoes 16 is substantially null. The power source 1 begins the start-up of the driven machine 4 without being affected by the inertia of the flywheel mass 5. In this step, the system comprising the hub 12 and the movable masses 14a, 14b is quickly driven into rotation. The system angular speed quickly increases (curve C1) from instant t0 to instant t1.

As the rotational speed (curve C1) increases between t0 and t1, the drag (friction force) exerted by the two movable masses 14a and 14b on the flywheel mass 5 increases, the speed of this latter thus gradually increases according to the curve C2. The first step ends at the instant t1, when a first angular speed (in the example approximately 450 rpm) of the input shaft 7 is achieved.

In the second step, beginning at the instant t1 and ending at the instant t2, the torque generated by the drag force exerted by the two movable masses 14a and 14b is equal to the maximum torque that the power source 1, for example the internal engine of a tractor, can supply.

In this step all the members, including the internal combustion engine and the driven machine 4, remain therefore in a balance condition at substantially constant speed (curve C2). Vice versa, due to the substantially constant torque applied by the movable masses 14a, 14b through the friction shoes 16, the angular speed of the flywheel mass 5 increases in linear fashion, until reaching the speed of the input shaft 7 and the output shaft 8, at the instant t2, where the second step ends and the third step begins.

Essentially, during the second step t1-t2 the power source 1 continues to supply the maximum torque and the system practically limits the torque demand according to the ability of the power source. The flywheel mass angularly accelerates gradually, without the need of having a particularly high starting torque. The smaller the torque supplied by the power source, the longer the duration of the second step is.

The second step ends (instant t2) when the speed of the automatic starting device (hub 12, movable masses 14a, 14b) and of the flywheel mass 5 are equal.

In the third step (beginning at the instant t2 and ending when the steady-state conditions have been achieved) the flywheel mass 5 rotates synchronously with the movable masses 14a, 14b and the hub 12, thus becoming integral therewith. In practice, in this step the flywheel mass 5, the hub 12 and movable masses 14a, 14b, by rotating at the same speed, "construct" the proper inertia flywheel again. The rotational speed is such that the drag force exerted by the two movable masses 14a, 14b (generated by the centrifugal force) is greater than the torque that can be supplied by the power source 1. Consequently, all components of the flywheel 3 (flywheel mass 5 and automatic starting device 9) are uniformly accelerated until achieving the required steady-state speed, for example usually approximately 1000 rpm.

The starting device 9 is called "automatic" because it does not need the operator's intervention as the system automatically manages and modulates the start-up step without overcharging the power source 1. In this way, it is possible to start up a driven machine 4 provided with a large flywheel 3 by exploiting a power source 1 suitable to the steady-state conditions, and not over-sized only in order to have a sufficient starting torque.

In practice, the flywheel mass 5 may represent approximately 90% of the overall mass of the flywheel, comprising (in addition to the flywheel mass 5) also the movable masses 14a, 14b and the hub 12, as well as the mutual coupling members. At the start-up, only 10% of the flywheel mas, constituted by the hub 12 and the movable masses 14a, 14b, is driven into rotation, while the flywheel mass 5, representing for example 90% of the total and being arranged mainly at a greater distance from the rotation axis, is substantially idle with respect to the transmission shaft.

As the movable masses 14a, 14b start to be pushed radially outwards by the centrifugal force, they start transmitting a drag torque through the friction shoes 16 to the flywheel mass 5. This latter is subjected to a torque that is small at the beginning and increases gradually, causing the angular acceleration thereof. When the flywheel mass 5 has achieved the angular speed of the movable masses 14a, 14b, these three components, together with the hub 12, behave as a single, i.e. monolithic flywheel.

The inventive solution is very flexible, as it allows the movable masses 14a, 14b of the automatic starting device 9, once the rotation of the driven machine 4 has been started, to touch, due to the centrifugal force, the flywheel mass 5 driving it smoothly into rotation and bringing it gradually to the steady-state speed with limited power sources.

It should be understood that the radial movement of the movable masses 14a, 14b can be minimum, tending to zero. What is important is that the radial constraining force counter-balancing the centrifugal force on the movable masses 14a, 14b is given, at least mainly, by the contact force between the movable masses 14a, 14b and the contact surface 5.6 of the flywheel mass 5, so that between the movable masses 14a, 14b and the flywheel mass 5 a friction force is generated increasing as the centrifugal force increase, i.e. as the rotational speed of the movable masses 14a, 14b increases.

What is claimed is:

1. A flywheel comprising:
   a flywheel mass;
   a first shaft;
   a second shaft, wherein the first shaft and the second shaft are coupled to one another forming a transmission shaft to transmit a torque, wherein one of the first shaft and the second shaft is an input shaft and another one of the first shaft and the second shaft is an output shaft;
   an automatic starting device for driving into rotation the flywheel mass, coaxial with the flywheel mass, rotatable with respect to the flywheel mass, and adapted to be torsionally coupled to a motion input;
   wherein the automatic starting device comprises a hub coaxial with the flywheel mass, and a plurality of movable masses that are arranged around a rotation axis of the flywheel, torsionally coupled to the hub for rotating therewith, and radially displaceable with respect to the hub;
   wherein the first shaft is angularly coupled to the hub and the flywheel mass is rotatingly supported on the second shaft; so that, when the hub rotates, each movable mass is pushed radially outwards in order to press against a contact surface integral with the flywheel mass and to transmit, from the hub to the flywheel mass, a drag torque that increases with the angular speed of the automatic starting device, as a result of the friction force between each movable mass and the contact surface integral with the flywheel mass.

2. The flywheel of claim 1, wherein the hub is idly supported by bearings on the flywheel mass.

3. The flywheel of claim 1, wherein the hub and the movable masses are arranged in a cavity formed in the flywheel mass and are surrounded by the contact surface integral with the flywheel mass.

4. The flywheel of claim 1, wherein the flywheel mass is integral with a housing for support bearings on a transmission shaft.

5. The flywheel of claim 1, wherein the movable masses have a perimeter surface adapted to couple by friction to the flywheel mass.

6. The flywheel of claim 5, wherein the movable masses have perimeter friction shoes co-acting with the contact surface of the flywheel mass.

7. The flywheel of claim 1, wherein each movable mass is shaped like an arc of a circular ring.

8. The flywheel of claim 7, wherein each movable mass extends for approximately 180° around the hub and is shaped, in particular, like a circular half-ring.

9. The flywheel of claim 1, wherein each movable mass is anchored to the hub by means of a pin housed in a radial seat; wherein the pin is fastened to the hub in a position that is radially fixed with respect thereto, and the radial seat is rigidly fastened to the movable mass, or vice versa, so that the movable mass can move radially with respect to the hub.

10. The flywheel of claim 1, wherein the hub is rotatably supported on a sleeve integral with the flywheel mass, in particular through the interposition of radial bearings.

11. The flywheel of claim 10, wherein the sleeve forms a housing for support bearings supporting the flywheel mass on a transmission shaft.

12. The flywheel of claim 10, wherein the sleeve is torsionally coupled, through a circular wall, to a main annular body of the flywheel mass, the sleeve, the circular wall and the main annular body forming an annular cavity where the hub and the radially movable masses are housed.

13. The flywheel of claim 1, wherein the hub has torsional coupling members for torsionally coupling to a transmission shaft.

14. A motion transmission system for transmitting motion between a power source and a driven machine, comprising a motion transmission line and a flywheel arranged on the motion transmission line;
   wherein the flywheel comprises a flywheel mass and an automatic starting device for driving into rotation the flywheel mass, coaxial with the flywheel mass, rotatable with respect to the flywheel mass, and torsionally coupled to the motion transmission line;
   wherein the automatic starting device comprises a hub coaxial with the flywheel mass, and a plurality of movable masses that are arranged around a rotation axis of the flywheel, torsionally coupled to the hub for rotating therewith, and radially displaceable with respect to the hub; so that, when the hub rotates, each movable mass is pushed radially outwards in order to press against a contact surface integral with the flywheel mass and to transmit, from the hub to the flywheel mass, a drag torque that increases with the angular speed of the automatic starting device, as a result of the friction force between each movable mass and contact surface integral with the flywheel mass.

15. The system of claim 14, wherein the first shaft and the second shaft have a releasable reciprocal coupling, in particular a splined coupling, so as to allow the coupling of the first shaft to, and the releasing thereof from, the second shaft.

16. A method for driving into rotation a driven machine through a power source by means of a motion transmission line along which a flywheel is provided, the method comprising the steps of:
   providing a flywheel comprising a flywheel mass, a first shaft, a second shaft and an automatic starting device for driving into rotation the flywheel mass, wherein the first shaft and the second shaft are coupled to one another forming a transmission shaft to transmit a torque, wherein one of the first shaft and the second shaft is an input shaft and another one of the first shaft and the second shaft is an output shaft, the automatic starting device being coaxial with the flywheel mass, the automatic starting device being rotatable with respect to the flywheel mass, the automatic starting device being configured to be torsionally coupled to a motion input, wherein the automatic starting device comprises a hub coaxial with the flywheel mass, and a plurality of movable masses that are arranged around a rotation axis of the flywheel, torsionally coupled to the hub for rotating therewith, and radially displaceable with respect to the hub; wherein the first shaft is angularly coupled to the hub and the flywheel mass is rotatingly supported on the second shaft; so that, when the hub rotates, each movable mass is pushed radially outwards in order to press against a contact surface integral with the flywheel mass and to transmit, from the hub to the flywheel mass, a drag torque that increases with the angular speed of the automatic starting device, as a result of the friction force between each movable mass and the contact surface integral with the flywheel mass
   driving into rotation the motion transmission line and the automatic starting device of the flywheel, the automatic starting device rotating integrally with the motion transmission line;
   moving radially outwards, due to centrifugal force, the radially movable masses of the automatic starting device, so as to press under the push of the centrifugal force, the radially movable masses against the flywheel mass and, through friction, to transmit to the flywheel mass a drag torque that increases with the rotational speed of the motion transmission line, thus causing flywheel mass to accelerate gradually until achieving the rotational speed of the motion transmission line;
   then, rotating the flywheel mass and the motion transmission line synchronously.

17. The system of claim 14, wherein the flywheel comprises a first shaft and a second shaft, wherein the first shaft and the second shaft are coupled to one another forming a transmission shaft to transmit a torque, wherein one of the first shaft and the second shaft is an input shaft and another one of the first shaft and the second shaft is an output shaft, the first shaft being angularly coupled to the hub and the flywheel mass being rotatingly supported on the second shaft.

18. The system of claim 17, wherein the flywheel mass is configured to be driven into rotation only when the first shaft and the second shaft reach a predetermined rotational speed.

19. The flywheel of claim 1, wherein the flywheel mass is configured to be driven into rotation only when the first shaft and the second shaft reach a predetermined rotational speed.

20. The flywheel of claim 1, wherein movement of the flywheel mass is based on a rotational speed of the first shaft and the second shaft.

* * * * *